May 25, 1965 ISAO MORIOKA 3,185,602
METHOD OF MANUFACTURING RELIEFS BY PHOTOGRAPHIC MEANS
Filed Feb. 6, 1962
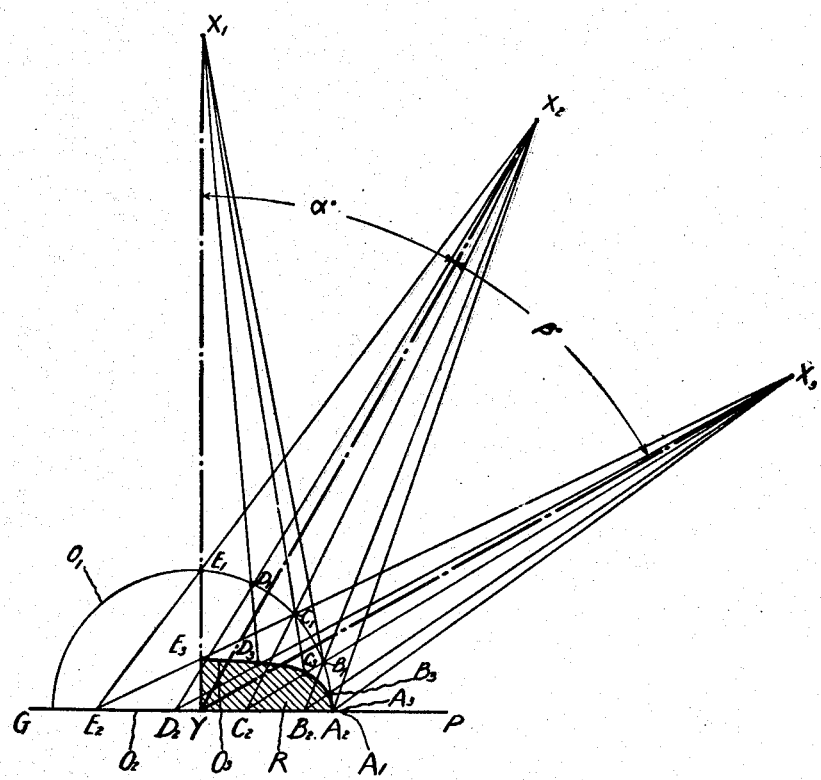
INVENTOR:
Isao MORIOKA
BY:
ATTORNEY

United States Patent Office 3,185,602
Patented May 25, 1965

3,185,602
METHOD OF MANUFACTURING RELIEFS BY PHOTOGRAPHIC MEANS
Isao Morioka, 40 Ookayama, Meguro-ku, Tokyo, Japan
Filed Feb. 6, 1962, Ser. No. 171,381
2 Claims. (Cl. 156—58)

This invention relates to a method of manufacturing reliefs by photographic means characterized by the fact that an object is photographed by a first camera to produce a first positive picture thereof, said camera being positioned at a distance to the ordinate line of said object and the central axial line of the lens of said camera falling on said ordinate line of said object and the same object is photographed also by the second camera to produce a second positive picture, said second camera having such a central axial line of lens as to form a suitable angle, $\alpha°$, with the central axial line of said first camera and the ordinate of said object and subsequently a projector for the second positive picture is located at the position and in the direction of second camera towards a standard plane intersecting the central axial line of the lens of the first camera at right angles so that the second positive picture is projected onto said standard plane and the image of said picture is photographed to produce a third positive picture thereof by a camera having a central axial line of its lens including a line to form a suitable angle, $\beta°$ with the central axial line of the lens of the second projector and finally, a block of clay is raised on said standard plane on which the first positive picture is projected by the first projector located at the position and in the direction of the first camera and simultaneously the third positive picture is projected onto said plane by the third projector located at the position and in the direction of the third camera and said block of clay is raised or cut off in such a manner that on said block there appear the intersecting points $A_3$, $B_3$, $C_3$, $D_3$, $E_3$ . . . of the projected lights by the first projector of a plurality of points $A_1$, $B_1$, $C_1$, $D_1$, $E_1$ . . . on the surface of said object and of the projected lights of a plurality of points $A_2$, $B_2$, $C_2$, $D_2$, $E_2$ . . . which have been projected onto said standard plane GP by projecting the third positive picture of those points $A_2$, $B_2$, $C_2$, $D_2$, $E_2$ . . . photographed by the third camera after projecting those points $A_1$, $B_1$, $C_1$, $D_1$, $E_1$ . . . onto said standard plane GP by means of the third projector.

With reference to the accompanying drawing, the invention will be explained in detail.

The drawing is an explanatory plan view to illustrate the method of manufacturing reliefs by photographic means of the present invention.

An object is placed at a distance $\overline{X_1Y}$ to the ordinate line Y of said object and in order to produce the first positive picture, the object is photographed by the first camera, the central axial line $X_1Y$ of its lens falling on said ordinate line Y.

In order to produce the second positive picture thereof, the same object is photographed by the second camera having such a central axial line $X_2Y$ of its lens as to form a suitable angle, $\alpha°$ with the central axial line $X_1Y$ of the lens of the first camera and the ordinate line Y of the object. Subsequently, onto a standard plane GP intersecting the central axial line $X_1Y$ of the lens of the first camera at right angles is projected the second positive picture by the second projector at the position and in the direction of the second camera. Then, the image of said projection is photographed by a camera having such a central axial line $X_3Y$ of its lens as to form a suitable angle, $\beta°$ with the central axial line $X_2Y$ of the lens of the second camera or the second projector so that the third positive picture of the same can be produced.

Finally, a block of clay is placed on a standard plane GP and then the first positive picture is projected onto said block of clay by means of the first projector located at the position and in the direction of the first camera and at the same time, the third positive picture is projected onto the same block of clay by means of the third projector located at the position and in the direction of the third camera and then said block of clay is raised or cut off in such a manner that on the same block there appear the intersecting points $A_3$, $B_3$, $C_3$, $D_3$, $E_3$ . . . of the projected lights by the first projector of a plurality of points $A_1$, $B_1$, $C_1$, $D_1$, $E_1$ . . . on the surface of said object and of the projected lights of a plurality of points $A_2$, $B_2$, $C_2$, $D_2$, $E_2$ . . . which have been projected onto said standard plane GP by projecting the third positive picture of those points $A_2$, $B_2$, $C_2$, $D_2$, $E_2$ . . . photographed by the third camera after projecting those points $A_1$, $B_1$, $C_1$, $D_1$, $E_1$ . . . onto said standard plane GP by means of the third projector.

By the way, the accompanying drawing illustrates one-half of a relief produced on the basis of the object $O_3$ by photographic means, namely, it is a half a relief $O_3$ on the right-side half of the central axial line $X_1Y$ of the lens of the first camera or the first projector.

It goes without saying that the other left-side half can be obtained by means of symmetrical photographing and projection with respect to the ordinate line $X_1Y$ to yield the perfect whole.

The object of this invention is to introduce a new and excellent method by which reliefs very similar to and harmonious with the object can be produced by physical means requiring no special skill.

What is claimed is:

1. A method for manufacturing reliefs by photographic means comprising the steps of photographing an object on a first selected line of sight to produce a first positive picture, photographing the object from a second position along a second selected line of sight to produce a second positive picture, projecting the second picture along the second selected line of sight onto a plane perpendicular to the first line of sight to produce an image thereon, photographing the image from a third position to produce a third picture, positioning a mass of material on said plane, projecting the first and third pictures onto the mass and adding and removing material to produce the relief.

2. A method for manufacturing reliefs by photographic means comprising the steps of simultaneously photographing an object from two selected positions along two selected lines of sight to produce two positive photographs, projecting one of said photographs onto a plane to produce an image thereon, photographing the image from a third selected position along a third line of sight to produce a third positive photograph, positioning a mass of material on said plane, projecting the first and third pictures onto the mass and adding and removing material to produce the relief.

References Cited by the Examiner
UNITED STATES PATENTS

| | | | |
|---|---|---|---|
| 891,012 | 6/08 | Smith | 156—58 |
| 2,099,612 | 11/37 | Limeses et al. | 41—25 |
| 2,350,796 | 6/44 | Morioka | 156—58 |
| 3,085,923 | 4/63 | Angew | 156—58 |

FOREIGN PATENTS 415,591  9/10  France.

EARL M. BERGERT, *Primary Examiner.*

JACOB STEINBERG, *Examiner.*